Patented Aug. 11, 1936

2,050,592

UNITED STATES PATENT OFFICE 2,050,592

BASIC BISMUTH SALTS OF AROMATIC MERCURY COMPOUNDS

Karl Streitwolf, Frankfort-on-the-Main, Alfred Fehrle, Bad Soden-on-the-Taunus, and Paul Fritzsche and Walter Herrmann, Frankfort-on-the-Main, Germany, assignors to Winthrop Chemical Company, Inc., New York, N. Y., a corporation of New York No Drawing. Application October 25, 1929, Serial No. 402,542. In Germany December 3, 1928

5 Claims. (Cl. 260—13)

The present invention relates to bismuth salts of mercury compounds of the aromatic series substituted by one side chain or a heterocyclic nucleus and containing at least one acid group, the mercury in said compounds being bound to a side chain or to the heterocyclic nucleus.

We have found that mercury compounds of the aromatic series substituted by one side chain or a heterocyclic nucleus and containing at least one acid group, the mercury in said compounds being bound to a side chain or to the heterocyclic nucleus, can easily be transformed into basic bismuth salts. The new compounds can be obtained by causing a soluble salt of the mercury compounds to react with simple or complex bismuth salts. These new preparations are suitable for the depot treatment, for instance, of syphilis.

In comparison with the known mercury salts of complex bismuthic acids, the new preparations have a considerably reduced toxicity and at least the same curative power. The mercury which in the known salts is bound in a pure ionogen manner, is bound in the new salts to a side chain or the heterocyclic nucleus, whereby a reduction of the toxicity is caused.

The following examples serve to illustrate our invention, but they are not intended to limit it thereto.

1. 52.3 grams of a compound of the following formula:

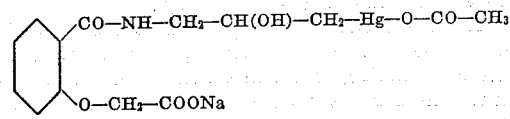

prepared according to Example 4 of U. S. Patent No. 1,693,432, dated November 27, 1928, in the name of Max Bockmühl and Adolf Schwarz, are dissolved in 150 cc. of water. A solution of 48.5 grams of bismuth nitrate in 48.5 grams of glycerine and 97 cc. of water is introduced drop by drop while well stirring. By the addition of 2N caustic soda solution the whole is neutralized and the white salt of the following probable formula:

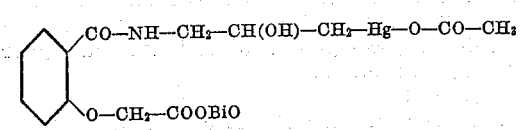

is filtered by suction, washed with water, alcohol and ether and dried in a vacuum.

2. In the same manner as indicated in Example 1, there can be obtained the basic bismuth salt of the arsonic acid of the following probable formula:

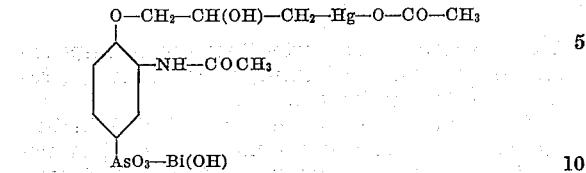

by causing 60 grams of the sodium salt of a compound of the following formula:

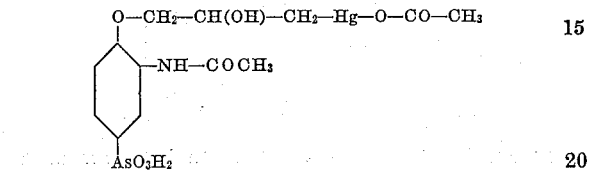

dissolved in 180 cc. of water to react with a solution of 48.5 grams of bismuth nitrate.

The starting material can be obtained by causing 3-acetylamino-4-hydroxybenzene-1-arsonic acid to react with allyl bromide in an alkaline solution. The acid readily dissolves in methyl alcohol and crystallizes from water in the form of white needles. The mercurization is effected in the same manner as in the starting material used in Example 1.

3. 39.5 grams of the sodium salt of a compound of the following formula:

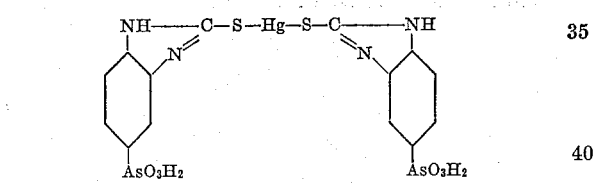

prepared by causing inorganic mercury compounds to act upon a compound of the following formula:

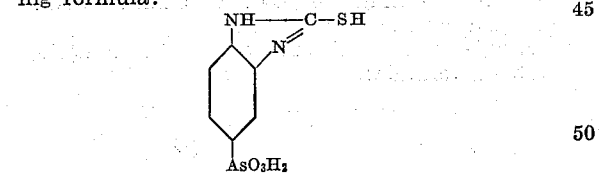

are dissolved in 10 times the quantity of water. Then a solution of 48.5 grams of bismuth nitrate in glycerine and water is introduced while well stirring. Thereby the basic bismuth salt of the arsonic acid of the following probable formula:

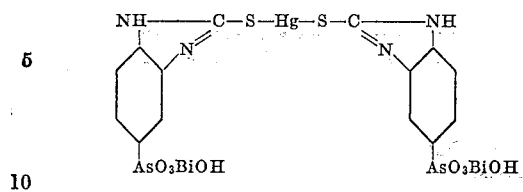

separates in the form of a colorless precipitate, which is filtered by suction, washed with water and dried in a vacuum.

In order to prepare the starting material 3.4-diaminobenzene-arsonic acid is transformed by interaction with potassium xanthogenate into a compound of the following formula:

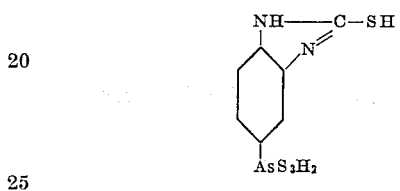

and the latter is converted into the corresponding arsonic acid by treating it with freshly precipitated lead carbonate.

4. In the same manner as indicated in Example 3 there can be obtained the colorless bismuth salt of the carboxylic acid of the following probable formula:

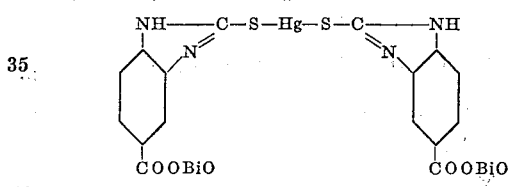

by causing 31.5 grams of the sodium salt of a compound of the following formula:

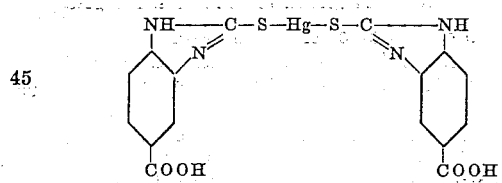

dissolved in 3.15 liters of water, to react with a solution of 48.5 grams of bismuth nitrate.

The starting material can be prepared by causing inorganic mercury salts to act upon a compound of the following formula:

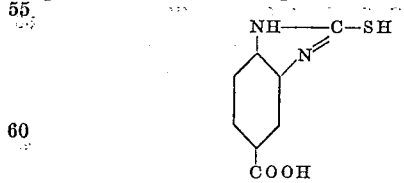

which can be prepared according to Example 3 of U. S. Patent No. 1,558,584, dated October 27, 1925, in the name of Max Bockmühl, Gustav Ehrhardt and Paul Fritzsche.

5. The colorless bismuth salt of the following probable formula:

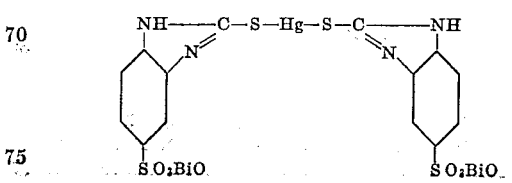

can be obtained in a manner analogous to that indicated in Example 3, by adding 48.5 grams of bismuth nitrate to 34.9 grams of the sodium salt of a compound of the following formula:

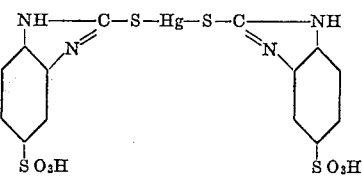

dissolved in 500 cc. of water.

The starting material can be prepared by causing sodium xanthogenate to act upon 1,2-diaminobenzene-4-sulfonic acid (cf. "Berichte der Deutschen Chemischen Gesellschaft", volume 21, page 3221). The product crystallizes from diluted alcohol in the form of beautiful, colorless laminae and, when mixed with inorganic mercury salts in an aqueous solution, the corresponding mercury derivative is obtained.

6. 33.6 grams of the sodium salt of meta-mercury-allylthiourea-benzoic acid of the following formula:

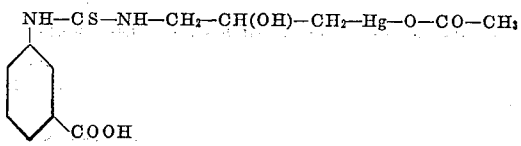

prepared by causing meta-allylthiourea-benzoic acid (cf. "Berichte der Deutschen Chemischen Gesellschaft", volume 17, page 431) to react with inorganic mercury salts according to the process described in the U. S. Patent specification No. 1,693,432, above referred to, are dissolved in 750 cc. of water and mixed while stirring with a solution of 48.5 grams of mercury nitrate. Thereby the yellow bismuth salt of the mercury compound of the following probable formula:

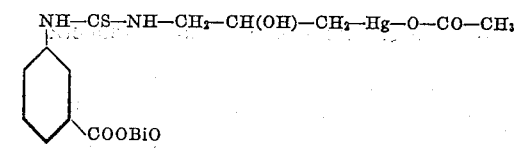

separates, which is filtered by suction, washed with water and dried in a vacuum.

Instead of the benzene- and benzimidazol-compounds respectively, there can, of course, also be used as starting materials other aromatic compounds, as for instance naphthalene and other heterocyclic compounds, as for instance oxazol-derivatives or the like.

The nuclei may be substituted by alkyls, halogen, amino- and nitro-groups or the like.

Instead of the acid radicals in the examples, there can also stand other acid radicals, for instance instead of the oxy-acetic radical in Example 1, the carboxylic acid, sulfonic acid radical or the like.

Instead of the mercury-allyl-compounds mentioned in Examples 1 and 2, there can also be used mercury compounds of crotonyl and higher homologous radicals.

We claim:

1. A basic bismuth salt of a compound of the aromatic series containing one acid group and a mercury-containing aliphatic side chain free from an acid group.

2. A basic bismuth salt of a compound of the aromatic series containing one acid group and a mercury-containing aliphatic side chain free from an acid group, which side chain contains a propylene radical.

3. The basic bismuth salt of the following formula:

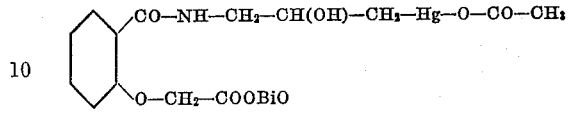

obtainable by causing a water-soluble bismuth salt to act upon a soluble salt of a compound of the following formula:

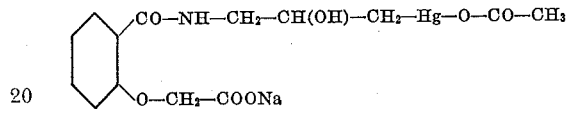

4. The basic bismuth salt of the following formula:

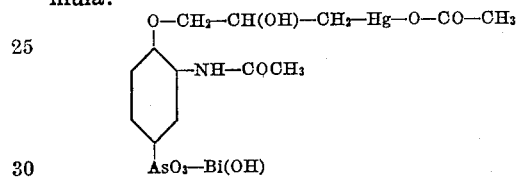

obtainable by causing a water-soluble bismuth salt to act upon a soluble salt of a compound of the following formula:

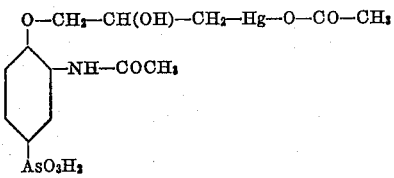

5. The basic bismuth salt of the following formula:

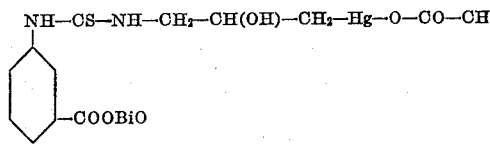

obtainable by causing a water-soluble bismuth salt to act upon a soluble salt of a compound of the following formula:

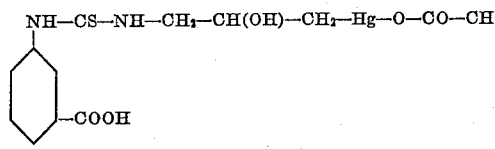

KARL STREITWOLF.
ALFRED FEHRLE.
PAUL FRITZSCHE.
WALTER HERRMANN.